United States Patent
Sheppard et al.

(10) Patent No.: US 6,455,150 B1
(45) Date of Patent: *Sep. 24, 2002

(54) MULTI-LAYER ORIENTED HEAT SEALABLE FILM STRUCTURE OF IMPROVED MACHINABILITY

(76) Inventors: Karen A. Sheppard, 67 Edendery Cir., Fairport, NY (US) 14450; Jay Kin Keung, 6011 Allen Padgham Rd., Macedon, NY (US) 14502; Francis Tran The-Dzuy, 1349 Ayrault Rd., Fairport, NY (US) 14450; Joseph E. Brew, 801 East Ave., Newark, NY (US) 14513; Benoit Ambroise, Rue de la Barriere, 50, B-6792 Halanzy (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/164,598

(22) Filed: Dec. 9, 1993

(51) Int. Cl.$^7$ .................. B32B 27/08; B32B 27/18; B32B 27/32; B32B 31/30

(52) U.S. Cl. ............. 428/327; 428/323; 428/343; 428/346; 428/347; 428/349; 428/354; 428/355 EN; 428/515; 428/516; 428/523; 156/244.11; 264/173.16

(58) Field of Search .................. 428/323, 331, 428/327, 405, 515, 516, 523, 35.7, 343, 346, 347, 349, 354, 355 EN; 156/244.11; 264/173.16

(56) References Cited

U.S. PATENT DOCUMENTS

| | | | |
|---|---|---|---|
| 4,533,509 A | 8/1985 | Gust et al. | 264/171 |
| 4,595,625 A * | 6/1986 | Crass et al. | 428/215 |
| 4,618,527 A | 10/1986 | Doyen | 428/213 |
| 4,652,489 A | 3/1987 | Crass et al. | 428/337 |
| 4,659,612 A | 4/1987 | Balloni et al. | 428/213 |
| 4,692,379 A | 9/1987 | Keung et al. | 428/349 |
| 4,720,420 A | 1/1988 | Crass et al. | 428/216 |
| 4,734,317 A * | 3/1988 | Bothe et al. | 428/215 |
| 4,761,327 A * | 8/1988 | Hamano et al. | 428/220 |
| 4,764,425 A | 8/1988 | Balloni et al. | 428/331 |
| 4,769,416 A | 9/1988 | Mizuno et al. | 525/106 |
| 4,961,992 A * | 10/1990 | Balloni et al. | 428/332 |
| 4,966,933 A * | 10/1990 | Kawakami et al. | 524/310 |
| 5,057,177 A | 10/1991 | Balloni et al. | 156/244.11 |
| 5,110,671 A * | 5/1992 | Balloni et al. | 428/218 |
| 5,169,714 A * | 12/1992 | Kondo et al. | 428/331 |

FOREIGN PATENT DOCUMENTS

| | | |
|---|---|---|
| EP | 0 242 055 | 10/1987 |
| WO | WO 95/15256 | 6/1995 |

OTHER PUBLICATIONS

Schmitz, Peter et al., "Films." Ullmann's Encyclopedia of Industrial Chemistry, 5th Ed., vol. A11, pp. 85–110, Jan., 1988.*

* cited by examiner

*Primary Examiner*—Vivian Chen
(74) *Attorney, Agent, or Firm*—Dennis P. Santini; Rick F. James

(57) ABSTRACT

A heat-sealable multilayer film comprising: (a) an upper heat-sealable layer comprising (I) an ethylene polymer, copolymer, or terpolymer and (ii) a particulate, crosslinked hydrocarbyl-substituted polysiloxane having a mean particle size of from about 0.5 μm to about 20.0 μm, as a combined slip agent and antiblocking agent; (b) an intermediate core layer comprising a propylene polymer; and (c) a lower heat-sealable layer consisting essentially of (I) an ethylene polymer, copolymer, or terpolymer, (ii) a particulate, crosslinked hydrocarbyl-substituted polysiloxane having a mean particle size of from about 0.5 μm to about 20.0 μm, as a combined slip agent and antiblocking agent; and (iii) from about 0.15 wt% to about 1.5 wt% of a liquid, hydrocarbyl-substituted polysiloxane. The upper heat-sealable sealable layer does not contain a liquid polysiloxane, but may have a coating of liquid polysiloxane transferred from the lower heat-sealable layer.

17 Claims, No Drawings

MULTI-LAYER ORIENTED HEAT SEALABLE FILM STRUCTURE OF IMPROVED MACHINABILITY

FIELD OF THE INVENTION

This invention relates to the field of composite polymer films of reduced surface frictional characteristics and to a method of making such films. It more particularly refers to a biaxially oriented composite film structure having improved properties, including heat sealability, good machinability and reduced coefficient of friction.

BACKGROUND OF THE INVENTION

In the packaging of certain types of foods, such as snack foods including candies, potato chips, cookies and the like, it is common practice to employ a multi-layer film. Polypropylene films are widely used in the packaging industry due to their superior physical properties, such as, transparency, stiffness, moisture barrier characteristics and others. Despite these highly desirable properties, unmodified polypropylene film has the disadvantageous property of having a high inherent coefficient of friction and film-to-film destructive blocking on storage. This high film-to-film coefficient of friction makes polypropylene films difficult to be successfully employed in automatic packaging equipment in their unmodified form.

In the past, coefficient of friction characteristics of polypropylene and other thermoplastic films have been beneficially modified by the inclusion in the polymer of fatty acid amides, such as, erucamide and oleamide. The effectiveness of this type of material depends upon its ability to migrate to the surface of the film in order to reduce the coefficient of friction. Both of the aforementioned amides are commonly used for reducing coefficient of friction. The development of the desired low coefficient of friction value is strongly dependent upon the type and amounts of amides, and time and temperature aging effects. Even the heat history of the film while in storage and shipping and during subsequent converter processes, significantly affects the coefficient of friction. In addition, the presence of these types of fatty acid amides on the film surface results in visible adverse appearance effects, manifested by an increase in haze, a decrease in gloss and the presence of streaks. These materials also adversely effect the wettability and adhesion of solvent and water-based inks, coatings and adhesives.

In the case of oriented polypropylene films which are widely used in the food packaging industry, it is common to laminate this film with itself or with other thermoplastic films or with paper films. When oleamide or erucamide are used in the polypropylene films a significant increase in coefficient of friction has been observed after lamination to such films. It is theorized that this is due either to the migration of the amide back into the polypropylene film or to the loss of the additive layer at the film surface. Therefore, these types of oriented laminated polypropylene films have limited usage for particular converting processes. Attempts to replace these amides to provide a consistent coefficient of friction have not been successful.

In U.S. Pat. No. 4,533,509, there is described a multi-layer structure comprising a comparatively thick base layer of an optically clear thermoplastic resin and a comparatively thin surface layer containing a finely divided inorganic material in a proportion sufficient to thereby impart anti-block characteristics and decrease film-to-film coefficient of friction. The resulting film has non-blocking and improved slip characteristics without the adverse appearance, wetting and adhesion effects typically experienced with amide-modified films. However, when laminated to other films, such structures exhibit significantly higher coefficient of friction values and cannot be used in conventional form, fill and seal machines.

U.S. Pat. No. 4,618,527, discloses a biaxially oriented film structure comprising (I) a comparatively thick base layer of a thermoplastic resin containing: an antistatic combination of (a) a compound of the formula $RN(R_1)_2$ wherein R is a $C_6$–$C_{24}$ alkyl group $R_1$ is $H(OCH_2CH_2)_n$; n=1–25; and (b) a monoester of an aliphatic $C_2$–$C_{24}$ fatty acid; and a slip improving proportion of (c) a $C_{12}$–$C_{24}$ fatty amide; and (II) a comparatively thin surface layer on at least one surface of (I), the surface layer comprising a thermoplastic resin containing an anti-block and COF reducing proportion of a finely divided inorganic material. This structure can be laminated to another film such as a polymeric film or a paper film.

In U.S. Pat. No. 4,652,489, a sealable, opaque polyolefinic multilayer film composed of a polypropylene base layer, a non-sealable surface layer, and a sealable surface layer, is disclosed. The. sealable surface layer has a low minimum sealing temperature and is made from a copolymer of propylene and ethylene or butene-1 units and/or a terpolymer of ethylene, propylene and butene-1 units. The non-sealable layer is a combination of a propylene homopolymer and a slip agent. The base layer contains an additive which is incompatible with polypropylene. The process includes stretching of the film, and during the stretching step, the polymer matrix is torn open around the additive particles to form vacuoles which give the base layer a degree of opacity U.S. Pat. No. 4,659,612 discloses an oriented, polymer film laminate possessing a low coefficient of friction, good receptivity for water-based coatings and good optical characteristics.

U.S. Pat. No. 4,692,379 discloses an oriented, heat sealable polymer film laminate possessing a low coefficient of friction, good receptivity for water-based coatings and good optical clarity and a method for manufacturing such a laminate.

U.S. Pat. No. 4,720,420 discloses a sealable, transparent polyolefinic multilayer film composed of a polypropylene base layer, a non-sealable surface layer, and a sealable surface layer. The sealable surface layer has a low minimum sealing temperature and is made from a copolymer of propylene and ethylene or butene-1 units and/or a terpolymer of ethylene, propylene and butene-1 units. The non-sealable layer is a combination of a propylene homopolymer, a slip agent, and an anti-blocking agent. The process provided includes coextruding the three layers, biaxially stretching the coextruded film, and subjecting the non-sealable layer to a corona-discharge treatment.

U.S. Pat. No. 4,734,317 relates to a polyolefin film having a base layer composed essentially of propylene polymers and having sealing layers present on both sides, composed essentially of sealable olefin polymers. Polydialkylsiloxane is incorporated in a first of the two sealing layers, and this layer is not subjected to corona treatment. The second sealing layer is subjected to corona treatment and has polydialkylsiloxane, not incorporated, but present on its outer surface, the polydialkylsiloxane having been transferred to this layer by contact with the sealing layer in which polydialkylsiloxane is incorporated. The relative polydialkylsiloxane occupancy on the second layer, which is determined by means of ESCA spectroscopy, is not more than 15. The three-layer polyolefin film is prepared by a coextrusion process. It is particularly suitable for use as a packaging film on high-speed packaging machines.

U.S. Pat. No. 4,764,425 discloses an oriented, heat-sealable polypropylene film which possesses a low coefficient of friction, excellent anti-static behavior and good optical clarity.

U.S. Pat. No. 4,961,992 relates to a polymer film laminate having improved machinability on modern high speed belt drive machines, particularly when these machines are set up to form lap seals. A method of assembling such a film is also provided. The film includes an outside web having-an upper surface layer containing a silicone oil. This laminating web can be used with virtually any co-laminate, metallized or not, which is bonded thereto with an adhesive. Upon winding the composite film laminate upon a core, silicone oil is transferred to the inside surface of the laminates thus providing an inside coefficient friction which is about equal to or less than the outside coefficient of friction. Hot slip properties are also improved upon such transfer. The outside and inside webs are independently formed, which allows the inside web to include coatings or film layers which are not ordinarily usable in a silicone oil-containing film.

U.S. Pat. No. 5,110,671 discloses an oriented, multi-layer polymer film laminate having a core of isotactic polypropylene, an outside skin layer of isotactic polypropylene containing an anti-blocking agent and an inside heat sealable skin layer containing an anti-blocking agent and a coefficient of friction reducing amount of a silicone oil.

Despite these advances in the art, a need still exists for a film structure of improved machinability which also provides excellent sealability, strength and stiffness.

SUMMARY OF THE INVENTION

In accordance with the present invention, there is provided a film structure which includes at least one layer of an olefin homo-, co- or ter-polymer having a surface-treated external surface which is printable, sealable and machinable, the layer containing, as combined slip agent and antiblock, a particulate cross-linked hydrocarbyl-substituted polysiloxane. Particularly preferred particulate cross-linked hydrocarbyl-substituted polysiloxane include the polymonoalkylsiloxanes.

Also, a heat sealable multilayer film structure of improved machinability is provided. The film structure comprises an upper heat sealable layer comprising an olefinic homopolymer copolymer or terpolymer having a surface-treated external surface which is printable, sealable and machinable, the layer containing, as combined slip agent and antiblock, a particulate cross-linked hydrocarbyl-substituted polysiloxane, an intermediate layer comprising an olefinic polymer, and a lower heat sealable layer comprising an olefinic homopolymer, copolymer or terpolymer having an external surface which is sealable and machinable, the layer containing, as combined slip agent and antiblock, a particulate cross-linked hydrocarbyl-substituted polysiloxane.

A method of producing a-heat sealable multilayer film structure of improved machinability is also provided. The method includes the-step of coextruding a film structure, the film structure including an upper heat sealable layer comprising an olefinic homopolymer, copolymer or terpolymer having a surface-treated external surface which is printable, sealable and machinable, the layer containing, as combined slip agent and antiblock, a particulate cross-linked hydrocarbyl-substituted polysiloxane, an intermediate layer comprising an olefinic polymer, and a lower heat sealable layer comprising an olefinic homopolymer, copolymer or terpolymer having an external surface which is sealable and machinable, the layer containing, as combined slip agent and antiblock, a particulate cross-linked hydrocarbyl-substituted polysiloxane. In practicing the method of the present invention, it is particularly preferred to employ as the particulate dross-linked hydrocarbyl-substituted polysiloxane a polymonoalkylsiloxane.

By improved machinability is meant that the film exhibits a consistently low coefficient of friction and has improved anti-slip and non-blocking characteristics.

Accordingly, it is an object of the present invention to provide a film structure of excellent sealability.

It is another object of the present invention to provide a film structure with improved machinability.

It is a further object of the present invention to provide a film structure having an improved range of process operability.

It is yet another object of the present invention to provide a film which may be bonded to a wide variety of substrates and coatings.

It is a yet further object of the present invention to provide a film .structure in which a conventional treatment testing method can be used.

Other and additional objects, and the several advantages of the present invention, will become apparent to those of ordinary skill in this art upon a reading of the specification and the claims appended thereto.

DETAILED DESCRIPTION OF THE INVENTION

In general, the present invention can be practiced with any thermoplastic film, for example, the polyolefins in general, and specifically, polymers, copolymers and blends of ethylene, propylene, butylene, etc., polyesters, such as, polyethylene terephthalate acrylic polymers and copolymers and the like. The basic film structures of the present invention find utility when supported or laminated to another film in order to accommodate a particular end use. Thus, polymer film layers different from the intermediate layer can be laminated to the intermediate layer of the structure for particular purposes. Such polymeric films include any thermoplastic film different from the intermediate layer of the film.

Particularly preferred polymers employed as the intermediate layer of the film herein are the polypropylenes which are highly isotactic. The preferred polypropylenes are well known in the art and are formed by polymerizing propylene in the presence of stereospecific catalysts system. They can have a melt index at 230° C. ranging from about 0.1–25. The crystalline melting point is about 160° C. The number average molecular weight ranges from about 25,000 to 100,000. The density ranges from about 0.90–0.91.

For descriptive purpose only, the film structures of the present invention will be described as having an upper skin layer (a), an intermediate layer (b) and a lower skin layer (c). As may be appreciated by those skilled in the art, the use of the terms upper and lower to refer to particular skin layers is merely relative. Moreover, although referred to as skin layers, the upper and lower layers may have additional structures bonded thereto, based on the functional requirements of the overall structure.

The polymer materials which are contemplated as the material for use in forming skin layers (a) and (c) are suitably exemplified by polyolefinic homopolymers, copolymers and terpolymers. Where homopolymers are to be used, they may be formed by polymerizing the respective monomer. This can be accomplished in a conventional manner by bulk or solution polymerization, as those of ordinary skill in this art will plainly understand. The copolymers are exemplified by and include block copolymers, for example of ethylene and propylene, random copolymers, for example of ethylene and propylene, and other ethylene homopolymers, copolymers, terpolymers, or blends thereof.

Preferred for use in forming upper skin layer (a) and lower skin layer (c) are heat sealable polymeric materials selected from the group consisting of ethylene-propylene-butene-1 (EPB) terpolymer, ethylene-propylene (EP) random copolymer, linear low density polyethylene (LLDPE), low density polyethylene (LDPE), medium density polyethylene (MDPE), high density polyethylene (HDPE) or blends thereof.

Suitable EPB terpolymers are those obtained from the random inter-polymerization of from about 1 to about 8 weight percent ethylene, preferably from about 3 to about 6 weight percent ethylene with from about 65 to about 95 weight percent propylene, preferably from about 86 to about 93 weight percent propylene, butene-1 representing the balance. The foregoing EPB terpolymers are for the most part characterized by a melt index at 230° C. of from about 2 to about 16 and advantageously from about 3 to about 7, a crystalline melting point of from about 100° C. to about 140° C., an average molecular weight of from about 25,000 to about 100,000 and a density within the range of from about 0.89 to about 0.92 gm/cm$^3$.

The EP random copolymers generally contain from about 2 to about 7 weight percent ethylene, the balance being made up of propylene. The copolymers can have a melt index at 230° C. generally ranging from about 2 to about 15 and preferably from about 3 to about 8. The crystalline melting point is usually from about 125° C. to about 150° C. and the number average molecular weight range is from about 25,000 to 100,000. The density will usually range from about 0.89 to about 0.92 gm/cm$^3$.

In general, where blends of EPB terpolymer and EP random copolymer are used, such blends will contain from about 10 to about 90 weight percent EPB terpolymer and preferably from about 40 to about 60 weight percent EPB terpolymer, the balance being made up of EP random copolymer.

Heat sealable blends of homopolymer which can be utilized in providing layers (a) and/or (c) include about 1 to about 99 weight percent polypropylene homopolymer, e.g. one which is the same as, or different from, the polypropylene homopolymer constituting intermediate layer (a) blended with about 99 to about 1 weight percent of a linear low density polyethylene (LDPE).

Prior to extrusion, in accordance with the present invention, one or both skin layers (a) and/or (c) is compounded with an effective amount of a combined antiblocking and slip agent. Preferred combined antiblocking and slip agents are selected from the group of particulate cross-linked hydrocarbyl-substituted polysiloxanes. Particularly preferred are the particulate cross-linked polymonoalkylsiloxanes. Most particularly preferred are non-meltable polymonoalkylsiloxanes characterized as having a mean particle size of about 0.5 to about 20.0 um and a three dimensional structure of siloxane linkages. Such materials are commercially available from Toshiba Silicone Co., Ltd., worldwide, and in the United States from General Electric Co., and are marketed under the tradename Tospearl. Other commercial sources of similar suitable materials are also known to exist.

Although the polymer from which skin layer (a) is formed is not compounded with a silicone oil, this layer may ultimately acquire a machinability-improving and coefficient of friction-reducing amount of silicone oil. Thus, when the finished film laminate containing silicone oil on the exposed surface of skin layer (c) is taken up on a winding coil, some of the silicone oil will be transferred from this surface to the exposed surface of skin layer (a), primarily to the exposed surfaces of the combined antiblocking and slip agent particles which protrude from layer (a). However, since the interior of layer (a) contains no amount of silicone oil which could interfere with the heat sealing properties of this layer (and ordinarily contains no-silicone oil at all), the presence thereon of the transferred silicone oil serves to further enhance the coefficient of friction of the layer, improves its machinability, without significantly impairing its heat sealability.

Either or both layers (a) and (c) can also contain pigments, fillers, stabilizers, light protective agents or other suitable modifying ingredients if desired. Further, skin layers (a) and/or (c) can optionally contain a minor amount of an additional antiblock material, such as silica, clays, talc, glass, and the like. These antiblock materials can be-used alone, or different sizes and shapes can be blended to optimize machinability. The major proportion of these particles, for example, anywhere from more than half to as high as 90 weight percent or more, will be of such a size that a significant portion of their surface area, will extend beyond the exposed surface of such skin layer.

In order to enhance its receptivity for water-based coatings, the upper skin layer can be advantageously treated by flame treating.

Lower skin layer (c) of the film laminate can be of substantially the same composition as that of upper surface layer (a). In a preferred embodiment, the polymer constituting layer (c) is compounded with a silicone oil. The silicone oil advantageously possesses a viscosity of from about 350 to about 100,000 centistokes with 10,000 to about 60,000 centistokes being especially preferred. Examples of suitable silicone oils are polydialkylsiloxanes, polyalkylphenylsiloxanes, olefin-modified siloxane oils, polyether-modified silicone oils, olefin/-polyether-modified silicone oils, epoxy-modified silicone oils and alcohol modified silicone oils, polydialkylsiloxanes which preferably have from about 1 to about 4 carbon atoms in the alkyl group, in particular polydimethyl-siloxanes. Of the foregoing, the polydialkylsiloxanes, in particular, a polydimethylsiloxane, are preferred for use herein.

The silicone oil is added to layer (c) generally in the form of a dispersion or emulsion, the silicone being present within, as well as on the exposed surface of this layer as discrete microglobules, frequently of an average size of from about 1 to about 2 microns. The silicone oil, which is generally substantially uniformly distributed on the exposed surface of layer (c), is responsible for improving machinability and imparting a further reduction in the coefficient of friction to this surface as well as the exposed surface of layer (a) when some of the oil is transferred thereto after these surfaces have been placed in mutual contact, e.g., as will occur when the laminate film has been wound on a winding coil.

Polydimethylsiloxane or other silicone oils can be present at from about 0.15 to about 1.5 weight percent, preferably less than 0.5 weight percent, of lower layer (c). Some of this silicone oil will, of course, be present on the exposed surface of layer (c). The amount selected should in any event be sufficient to provide a coefficient of friction of layers (a) and (c) (following transfer of silicone oil microglobules to the latter) of about 0.4 or less, preferably between about 0.25 to about 0.3 up to at least about 60° C. Because of the unique manner in which the silicone oil is applied to just the exposed surface of upper layer (a), such layer exhibits an improved coefficient of friction but not at the expense of its receptivity to water-based coatings, its heat sealability or its optical clarity.

The silicone oil should be incorporated as homogeneously possible in the polymer constituting layer (c). This can be achieved by either incorporating the silicone-oil as a dispersion or emulsion at room temperature and then heating the blend with the application of shearing forces or by incorporating the oil while the blend is being melted. The mixing temperature must be high enough to soften the blend and enable a very uniform mixture to be formed. The temperature required in a kneader or extruder is generally from about 170° to about 270° C.

Intermediate layer (b) can also contain anti-static agents, e.g., cocoamine or N,N bis(2-hydroxyethyl) sterylamine. Suitable amines include mono-, di, or tertiary amines.

Intermediate layer (b) will usually represent from about 70 to about 95 percent of the thickness of the overall film laminate or an even higher percentage thereof. Upper skin layer (a) and lower skin layer (c) are coextensively applied to each major surface of intermediate layer (b), usually by being coextruded directly thereon. For example, layers (a), (b) and (c) can be coextruded from a conventional extruder through a flat sheet die, the melt streams being combined in an adapter prior to being extruded from the die. Each of the skin layers (a) and (c) can comprise, for example, approximately 6.0% of the total thickness of the laminate. After leaving the die-orifice, the laminate structure is chilled and the quenched sheet then heated and stretched, e.g., five times in the machine direction (MD) and then subsequently, for example, eight times in the transverse direction (TD). The edges of the film can be trimmed. The film laminate is then wound on a reel in order to effect transfer of silicone oil from the exposed surface of layer (c) to the exposed surface of layer (a) as previously explained.

As a result of the biaxial orientation of the film structure herein, several physical properties of the composite layers, such as: flex-crack resistance, Elmendorff tear strength, elongation, tensile strength, impact strength and cold strength properties are improved. The resulting film can have, low water vapor transmission rate characteristics and low oxygen transmission rate characteristics. These improved physical properties make the film ideally suited for packaging food products, even those comprising liquids. The overall thickness of the laminate is not critical and advantageously can range from about 0.35 to about 2.0 mls.

Where the product of this invention is to be used as a label for goods, whether the label is opaque or transparent is a function of the objectives to be achieved. Where it is desired to hide the contents of the package being labeled, it would be preferable to use an opaque label. However, where it is more desirable to expose the contents of the package to customer examination, the label should be transparent.

A suitable peelable label stock is often put up as an assemblage of components. In one such assemblage, the components include: a base liner, a release layer disposed on the base liner, and a label stock, with a suitable pressure sensitive adhesive disposed thereon, releasably adhered to the release layer on the base liner. In instances where the adhesive is a pressure sensitive adhesive, a release layer is disposed on the base liner. In other cases the adhesive may be one activatable by other means, such as, heat, solvent, etc. Where the adhesive is not pressure sensitive, but is activatable by some other means, a release liner is not needed.

As indicated above, instead of a pressure sensitive adhesive, activatable adhesives can be employed for certain labeling techniques. For instance, when a label is to be applied about the full circumference of a package or bottle, water or other solvent can activate an adhesive stripe or strip applied to one end of the label. The label is then fixed in place by a slight overlap of the other end of the label. It has also be discovered that die cutting of labels is materially enhanced by including inorganic particles, such as calcium carbonate in the label skin layer close to the adhesive and/or release layer. These particles may also cause some cavitation as a result.

When an opaque label or film structure is desired, the core or intermediate layer of the film structure of the present invention may be formed in accordance with U.S. Pat. No. 4,377,616, the disclosure of which is incorporated herein by reference in its entirety for all that it discloses.

Where opacifying agents are desired, they may be incorporated in the intermediate composition of this invention, in a proportion of up to about 10%, preferably at least about 1%, by weight. Suitable conventional opacifying agents can be added to the melt mixture of the intermediate polymer before extrusion thereof into a film. Opacifying compounds are generally well known in this area. They may be exemplified by iron oxides, carbon black, aluminum, aluminum oxide, titanium dioxide, and talc.

The processability and machinability of the film may be further enhanced by the inclusion in the polymeric material used to form one or both skin layers of a small percentage of finely subdivided inorganic material. Such inorganic material not only can impart antiblock characteristics to the multi-layer film structure of the present invention, but also can reduce the coefficient of friction of the resultant film.

Contemplated finely divided inorganic materials, referred to above may be exemplified by: syloid, a synthetic amorphous silica gel, having a composition of about 99.7% $SiO_2$; diatomaceous earth having a composition of, for example, 92% $SiO_2$, 3.3% $Al_2O_3$, and 1.2% $Fe_2O_3$ which has an average particle size of about 5.5 microns, which particles are porous and irregularly shaped; dehydrated kaolinite (Kaopolite SF) having a composition of 55% $SiO_2$, 44% $Al_2O_3$ and 0.14% $Fe_2O_3$, which has an average particle size of about 0.7 microns, and which particles are thin flat platelets; and synthetic, precipitated silicates, for example Sipernat 44, a material having a composition of 42% $SiO_2$, 36% $Al_2O_3$, and 22% $Na_2O$, which has an average particle size of about 3–4 microns, and in which the particles are porous and irregularly shaped.

The polyolefin blends used to coextrude the multi-layer high opacity film structures contemplated herein are suitably formed by employing commercially available intensive mixers, such as those of the Bolling or Banbury type.

If desired, the exposed surface of skin layers (a) and/or (c) may have applied to it, coating compositions or substrates such as another polymer film or a laminate; a metal foil, such as aluminum foil; cellulosic webs, e.g. numerous varieties of paper, such as corrugated paperboard, craft paper, glassine, cartonboard, nonwoven tissue, e.g. spunbonded polyolefin fiber, melt-blown microfibers, etc. The application may employ a suitable adhesive, e.g. a hot melt adhesive, such as low density polyethylene, ethylene-methacrylate copolymer; a water-based adhesive such as polyvinylidene chloride latex, and the like.

EXAMPLES

The following specific examples are presented herein to illustrate particular embodiments of the present invention and hence are only illustrative of this invention and are not to be construed in a limiting sense. Unless indicated to be on some other basis, all parts and percentages are by weight.

Coefficient of friction values referred to herein have been determined according to the procedure of ASTM D 1894-78. Haze and gloss values referred to herein were determined according to the procedures of ASTM D 1003-61 and D 2457-70, respectively.

In the following comparative -examples, Examples 1–3, Example 1 illustrates a film laminate containing erucamide, a fatty acid amide slip agent, and as such, is representative of a known type of composite film. Example 2 demonstrates the heat sealability-impairing effect of a laminate in which silicone oil has been compounded in the polymers constituting both layers (a) and (c). Example 3 is illustrative of a laminate film and film forming method wherein silicone oil is compounded in the polymer constituting layer (c).

Example 1

A intermediate layer (b) of about 20 microns thickness derived from a propylene homopolymer of high stereoregularity containing 750 ppm erucamide is melted and coextruded with an upper skin layer (a) of about 0.61 microns thickness derived from an ethylene-propylene-butene-1 terpolymer or ethylene-propylene random copolymer and a lower skin layer (c) of about 1.2 microns thickness of the aforesaid ethylene-propylene-butene-1 terpolymer. The EPB terpolymer components of layers (a) and (c) each contains about 0.2 weight percent of synthetic amorphous silica in the form of approximately spherical particles averaging 3 microns diameter. The extrudate is then cooled, reheated and stretched biaxially 4–6 times in the machine direction and 8–10 times in the transverse direction. Subsequently, upper skin layer (a) is corona treated in a conventional manner and wound in a mill roll form. After 1–3 days of hot room aging at 100°–125° F., the coefficient of friction (COF) of layers (a) and (c) is 0.26 and 0.29 respectively.

However, it must be noted that since the film of this example utilizes a migratory slip agent which requires hot room aging, its COF value is often inconsistent and unpredictable. Also, as shown in the table below, layer (a) was not receptive to a water-based polyvinylidene chloride adhesive.

Example 2

Example 1 was substantially repeated but using an isotactic polypropylene as the resin constituting intermediate layer (b). Erucamide was not present. Polydimethylsiloxane at 0.6 weight percent was compounded in layers (a) and (c). As shown from the data in the accompanying table, coefficient of friction behavior was acceptable and water-based ink and water-abased adhesive wet-out/adhesion were acceptable. However, the heat sealability capability of layer (a) was essentially destroyed due to the presence of the silicone oil in layer (a).

Example 3

Example 2 was substantially repeated but with 0.6 weight percent of polydimethylsiloxane compounded in layer (c) only. Layer (a) contained no silicone oil. The improvement of coefficient of friction equilibrium, good converting characteristics of the PVDC adhesive and retention of heat sealability are noted from the data in the accompanying table. The resultant film also possesses good optical clarity characteristics. However, this film will not machine adequately on the horizontal or vertical form fill and seal machines.

Film properties are compared for the films of Examples 1–3 in Table 1, below.

TABLE 1

| Example | Treated Side | Slip | Treated To Treated COF | Untreated To Untreated COF | Crimp Seal Strength 240° F. ¾ Sec. Treated/ Treated |
|---|---|---|---|---|---|
| 1 | Layer (a) | 750 ppm Erucamide | .26 | .22 | 425 gm/in |
| 2 | Layer (a) | Silicone oil in Layers (a) and (c) | .30 | .30 | 0 |
| 3 | Layer (a) | Silicone oil in Layer (c) only | .30 | .30 | 475 gm/in |

Example 4

The coextruded biaxially oriented film structure of this example consists of a polypropylene intermediate layer with two outer heat sealant layers containing the particulate cross-linked polymonoalkylsiloxane non-migratory combined antiblock and slip agent (GE Tospearl RS-344). Two terpolymer sealant resins were used, each containing a loading of 2500 ppm of the non-migratory slip agent, with a particle size of 4.5 microns. The total gauge of this particular film structure was 1.25 mil, with target skin thicknesses of 2.5 gauge (upper) and 4.0 gauge (lower). The film structure was biaxially oriented and flame treated on one side to improve its wettability and to optimize the printability and lamination strengths.

The resultant biaxially oriented film structure had the following properties tested immediately off-line:

TABLE 2

| Minimum Seal Temperature | | Coefficient of Friction | | | |
|---|---|---|---|---|---|
| T/T(1) | U/U(2) | T/T(1) | U/U(2) | Haze | Gloss |
| 227 | 216 | 0.11 | 0.14 | 2.1 | 86.5 |

(1)Treated surface to treated surface.
(2)Untreated surface to untreated surface.

This film structure had good COF-properties, however, its machinability was poor.

Example 5

The film structure of Example 5 had an identical resin as the intermediate (b) layer as Example 4, but utilized different skin layer (a) and skin layer (c) resins. The upper skin layer (a) had 2000 ppm of the non-migratory antiblock, and the lower skin layer (c) had 1000 ppm, both 4.5 micron size (GE Tospearl RS-344). The lower skin layer (c) also had the addition of 4000 ppm silicone oil. The film structure was flame treated on one side to improve its wettability and to optimize the printability and lamination strengths.

The resultant biaxially oriented film structure had the following properties tested immediately off-line:

TABLE 3

| Minimum Seal Temperature | | Coefficient of Friction | | | |
|---|---|---|---|---|---|
| T/T(1) | U/U(2) | T/T(1) | U/U(2) | Haze | Gloss |
| 240 | 226 | 0.13 | 0.14 | 1.7 | 85.3 |

(1)Treated surface to treated surface.
(2)Untreated surface to untreated surface.

This film structure had good COF and hot slip properties, and also machined well.

Example 6

The film structure of Example 6 was identical to the Example 5 structure, except for slightly lower non-migratory antiblock loading levels (again, GE Tospearl RS-344 was used) and the addition of 1000 ppm silica antiblock agent, 4 microns in size, to both the upper and lower skin layers (a and c). The film structure was flame treated on one side to improve its wettability and to optimize the printability and lamination strengths.

The resultant biaxially oriented film structure had the following properties tested immediately off-line:

TABLE 4

| Minimum Seal Temperature | | Coefficient of Friction | | | |
|---|---|---|---|---|---|
| T/T(1) | U/U(2) | T/T(1) | U/U(2) | Haze | Gloss |
| 225 | 234 | 0.31 | 0.15 | 1.2 | 88.1 |

(1)Treated surface to treated surface.
(2)Untreated surface to untreated surface.

The film structure of this example had good COF and improved hot slip properties. The machinability was also found to be very good.

Example 7

This example utilizes a high density polyethylene as the upper skin layer (a), which contains 1600 ppm of particulate cross-linked polymonoalkylsiloxane non-migratory combined antiblock and slip agent (again, GE Tospearl RS-344 was used) and a blend of low density polyethylene. The intermediate layer is identical to -that described in Examples 4, 5 and 6. The lower skin layer (c) resin contained 1600 ppm of the same non-migratory combined antiblock and slip agent. The overall gauge of this film structure was 0.7 mil, with target skin thicknesses of 3 gauge for the upper skin layer and 4 gauge for the lower skin layer. The film was flame treated on one side to improve its wettability and to optimize the printability and lamination strengths.

The resultant biaxially oriented film structure had the following properties tested immediately off-line:

TABLE 5

| Minimum Seal Temperature | | Coefficient of Friction | | | |
|---|---|---|---|---|---|
| T/T(1) | U/U(2) | T/T(1) | U/U(2) | Haze | Gloss |
| 232 | 219 | 0.21 | 0.65 | 1.5 | 85.5 |

(1)Treated surface to treated surface.
(2)Untreated surface to untreated surface.

This film had good COF properties, on the treated side, and marginal machinability.

TABLE 6

| Example No. | Minimum Seal Temperature | | Coefficient of Friction | | Haze | Gloss | Machinability(3) |
|---|---|---|---|---|---|---|---|
| | T/T(1) | U/U(2) | T/T(1) | U/U(2) | | | |
| 4 | 227 | 216 | 0.11 | 0.14 | 2.1 | 86.5 | Poor |
| 5 | 240 | 226 | 0.13 | 0.14 | 1.7 | 85.3 | Good |
| 6 | 225 | 234 | 0.31 | 0.15 | 1.2 | 88.1 | Good |
| 7 | 232 | 219 | 0.21 | 0.65 | 1.5 | 85.5 | Marginal |

(1)Treated surface to treated surface.
(2)Untreated surface to untreated surface.
(3)Machinability indicates the film's performance on both horizontal and vertical packaging machines.

Although the present invention has been described and exemplified with respect to preferred embodiments, it is to be understood that modifications and variations may be utilized without departing from the spirit and scope of this invention. Such modifications and variations are considered to be within the purview and scope of this invention.

What is claimed is:
1. A heat-sealable, multilayer film structure, comprising:
(a) an upper heat-sealable layer having a surface-treated external surface which is printable, sealable, and machinable, the upper heat-sealable layer comprising (i) an olefin selected from the group consisting of an ethylene-propylene-butene- 1 terpolymer, an ethylene-propylene random copolymer, a linear low density polyethylene, a low density polyethylene, a medium density polyethylene, a high density polyethylene, and blends thereof, and (ii) a particulate, crosslinked, hydrocarbyl-substituted polysiloxane having a mean particle size of from about 0.5 $\mu$m to about 20.0 $\mu$m, as a combined slip agent and antiblock;
(b) an intermediate layer comprising a propylene polymer; and
(c) a lower heat-sealable layer having an external surface which is sealable and machinable, the lower heat-sealable layer consisting essentially of (i) an olefin selected from the group consisting of an ethylene-propylene-butene-1 terpolymer, an ethylene-propylene random copolymer, a linear low density polyethylene, a low density polyethylene, a medium density polyethylene, a high density polyethylene, and blends thereof, (ii) a particulate, crosslinked, hydrocarbyl-substituted polysiloxane having a mean particle size of from about 0.5 $\mu$m to about 20.0 $\mu$m, as a combined slip agent and antiblock, and (iii) from about 0.15 wt% to about 1.5 wt% of a liquid, hydrocarbyl-substituted polysiloxane, wherein the upper heat-sealable layer (a) does not comprise a liquid, hydrocarbyl-substituted polysiloxane, and the external surface of the upper heat-sealable layer (a) optionally has a coating of a liquid, hydrocarbyl-substituted polysiloxane transferred thereto from the liquid, hydrocarbyl-substituted polysiloxane contained in the lower heat-sealable layer (c).

2. The heat-sealable, multilayer film structure of claim 1, wherein the liquid, hydrocarbyl-substituted polysiloxane is polydialkylsiloxane.

3. The heat-sealable, multilayer film structure of claim 2, wherein the particulate, crosslinked hydrocarbyl-substituted polysiloxane of layers (a) and (c) is a crosslinked polymonoalkylsiloxane.

4. The heat-sealable, multilayer film structure of claim 3, wherein the particulate, crosslinked polymonoalkylsiloxane is a non-meltable polymonoalkylsiloxane.

5. The heat-sealable, multilayer film structure of claim 4, wherein the particulate, crosslinked, non-meltable polymonoalkylsiloxane has a three-dimensional structure of siloxane linkages.

6. The heat-sealable, multilayer film structure of claim 1, wherein the propylene polymer of layer (b) is an isotactic polypropylene.

7. The heat-sealable, multilayer film structure of claim 6, wherein the isotactic polypropylene has a melt index at 230° C. ranging from about 0.1 to about 25 g/10 minutes.

8. The heat-sealable, multilayer film structure of claim 7, wherein the isotactic polypropylene has a number average molecular weight within the range of from about 25,000 to about 100,000.

9. The heat-sealable, multilayer film structure of claim 8, wherein at least one outer surface thereof is treated by flame treating.

10. The heat-sealable, multilayer film structure of claim 1, wherein the external surface of the upper heat-sealable layer (a) has a coating of a liquid, hydrocarbyl-substituted polysiloxane transferred thereto from the liquid, hydrocarbyl-substituted polysiloxane contained in the lower heat-sealable layer (c).

11. The heat-sealable, multilayer film structure of claim 1, wherein the liquid, hydrocarbyl-substituted polysiloxane is present in the lower heat-sealable layer (c) in an amount of from about 0.15 wt% to about 0.5 wt%.

12. A method of producing a heat-sealable, multilayer film structure, comprising the step of coextruding a film structure, the film structure including:

(a) an upper heat-sealable layer having a surface-treated external surface which is printable, sealable, and machinable, the upper heat-sealable layer comprising (i) an olefin selected from the group consisting of an ethylene-propylene-butene-1 terpolymer, an ethylene-propylene random copolymer, a linear low density polyethylene, a low density polyethylene, a medium density polyethylene, a high density polyethylene, and blends thereof, and (ii) a particulate, crosslinked, hydrocarbyl-substituted polysiloxane having a mean particle size of from about 0.5 µm to about 20.0 µm, as a combined slip agent and antiblock;

(b) an intermediate layer comprising a propylene polymer; and (c) a lower heat-sealable layer having an external surface which is sealable and machinable, the lower heat-sealable layer consisting essentially of (i) an olefin selected from the group consisting of an ethylene-propylene-butene-1 terpolymer, an ethylene-propylene random copolymer, a linear low density polyethylene, a low density polyethylene, a medium density polyethylene, a high density polyethylene, and blends thereof, (ii) a particulate, crosslinked, hydrocarbyl-substituted polysiloxane having a mean particle size of from about 0.5 µm to about 20.0 µm, as a combined slip agent and antiblock, and (iii) from about 0.15 wt% to about 1.5 wt% of a liquid, hydrocarbyl-substituted polysiloxane, wherein the upper heat-sealable layer (a) does not comprise a liquid, hydrocarbyl-substituted polysiloxane, and the external surface of the upper heat-sealable layer (a) optionally has a coating of a liquid, hydrocarbyl-substituted polysiloxane transferred thereto from the liquid, hydrocarbyl-substituted polysiloxane contained in the lower heat-sealable layer (c).

13. The method of claim 12, wherein the liquid, hydrocarbyl-substituted polysiloxane is polydialkylsiloxane.

14. The method of claim 13, wherein the particulate cross-linked hydrocarbyl-substituted polysiloxane of layers (a) and (c) is a cross-linked polymonoalkylsiloxane.

15. The method of claim 14, wherein the particulate, crosslinked polymonoalkylsiloxane is a non-meltable polymonoalkylsiloxane having a three-dimensional structure of siloxane linkages.

16. The method of claim 12, wherein the external surface of the upper heat-sealable layer (a) has a coating of a liquid, hydrocarbyl-substituted polysiloxane transferred thereto from the liquid, hydrocarbyl-substituted polysiloxane contained in the lower heat-sealable layer (c).

17. The method of claim 12, wherein the liquid, hydrocarbyl-substituted polysiloxane is present in the lower heat-sealable layer (c) in an amount of from about 0.15 wt% to about 0.5 wt%.

* * * * *